US012276320B2

(12) United States Patent
Niederkofler et al.

(10) Patent No.: US 12,276,320 B2
(45) Date of Patent: Apr. 15, 2025

(54) SPINDLE SYSTEM, LINEAR ACTUATOR AND PIECE OF FURNITURE

(71) Applicant: LOGICDATA Electronic & Software Entwicklungs GmbH, Deutschlandsberg (AT)

(72) Inventors: Haymo Niederkofler, Graz (AT); Hannes Puck, Stainz (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 0 days.

(21) Appl. No.: 18/363,239

(22) Filed: Aug. 1, 2023

(65) Prior Publication Data
US 2024/0060553 A1    Feb. 22, 2024

(30) Foreign Application Priority Data

Aug. 18, 2022  (DE) .................. 10 2022 120 890.7

(51) Int. Cl.
*F16H 25/24* (2006.01)
*F16H 25/20* (2006.01)
*A47B 9/04* (2006.01)

(52) U.S. Cl.
CPC ..... *F16H 25/2056* (2013.01); *F16H 25/2009* (2013.01); *A47B 9/04* (2013.01); *F16H 2025/2436* (2013.01)

(58) Field of Classification Search
CPC ............. A47B 9/04; F16H 2025/2436; F16H 25/2056; F16H 25/2009; F16H 25/006
See application file for complete search history.

(56) References Cited

U.S. PATENT DOCUMENTS

| | | | |
|---|---|---|---|
| 9,091,334 B2* | 7/2015 | Kollreider | F16H 25/2056 |
| 10,758,036 B2* | 9/2020 | Lu | A47B 9/04 |
| 11,655,889 B2* | 5/2023 | Vonier | F16H 57/021 |
| | | | 180/444 |
| 12,091,076 B2* | 9/2024 | Huber | B62D 1/181 |

(Continued)

FOREIGN PATENT DOCUMENTS

| | | |
|---|---|---|
| CN | 107420506 A | 12/2017 |
| DE | 20214566 U1 | 3/2004 |

(Continued)

OTHER PUBLICATIONS

KMS—World Leading Manufacturer of Plastic & 316 Stainless Bearings. "Plastic Bearing vs. Steel Bearings".

*Primary Examiner* — Gregory Robert Weber
(74) *Attorney, Agent, or Firm* — Eschweiler & Potashnik, LLC

(57) ABSTRACT

In a spindle system with a hollow spindle for a linear actuator, the linear actuator has a telescopic tube system including an outer tube and at least one inner tube arranged coaxially with the outer tube and at least partially surrounded by the outer tube. A bearing is arranged to transmit axial forces between the hollow spindle and the outer tube. The hollow spindle at least partially surrounds an inner shaft of the spindle system and is connected to the inner shaft of the spindle system by one or more tappets of a positive and axially displaceable shaft-hub connection. The hollow spindle has a bearing seat for the bearing and an external thread on an outer side.

18 Claims, 11 Drawing Sheets

(56) References Cited

U.S. PATENT DOCUMENTS

| | | |
|---|---|---|
| 2009/0126521 A1 | 5/2009 | Schroeder |
| 2011/0174101 A1 | 7/2011 | Prottengeier et al. |
| 2014/0298934 A1* | 10/2014 | Marek ..................... F16H 25/20 |
| | | 74/89.33 |
| 2021/0321760 A1 | 10/2021 | Windhaber et al. |

FOREIGN PATENT DOCUMENTS

| | | |
|---|---|---|
| DE | 102010000970 A1 | 7/2011 |
| WO | 2022105856 A1 | 5/2022 |

\* cited by examiner

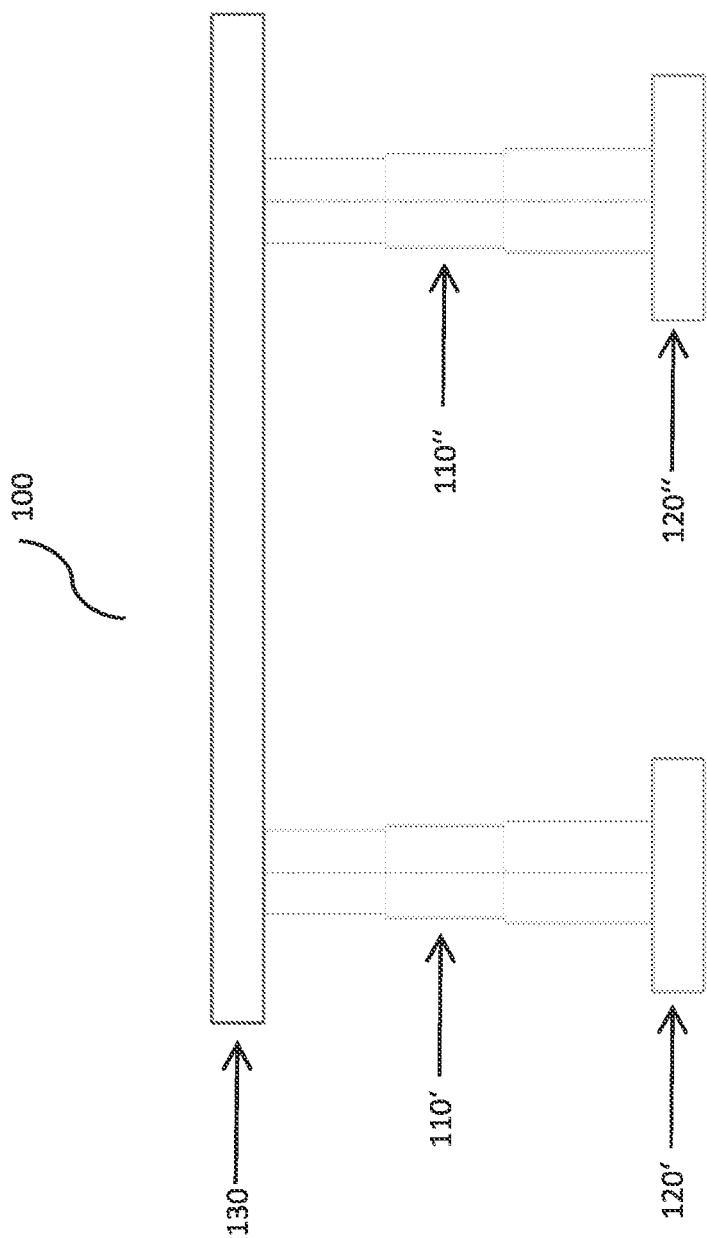

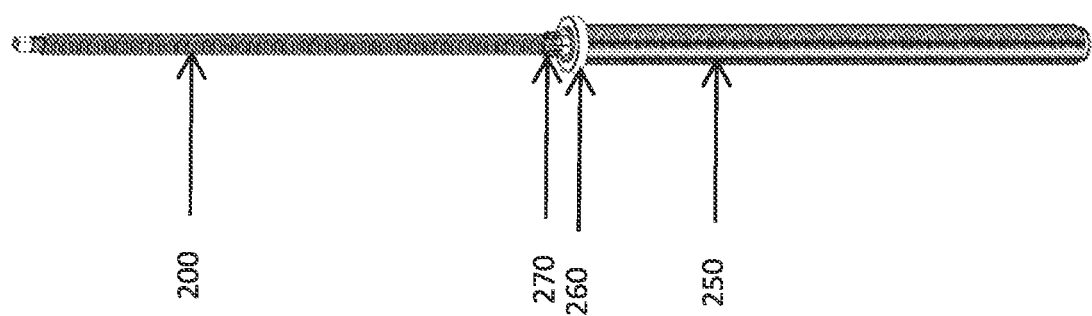
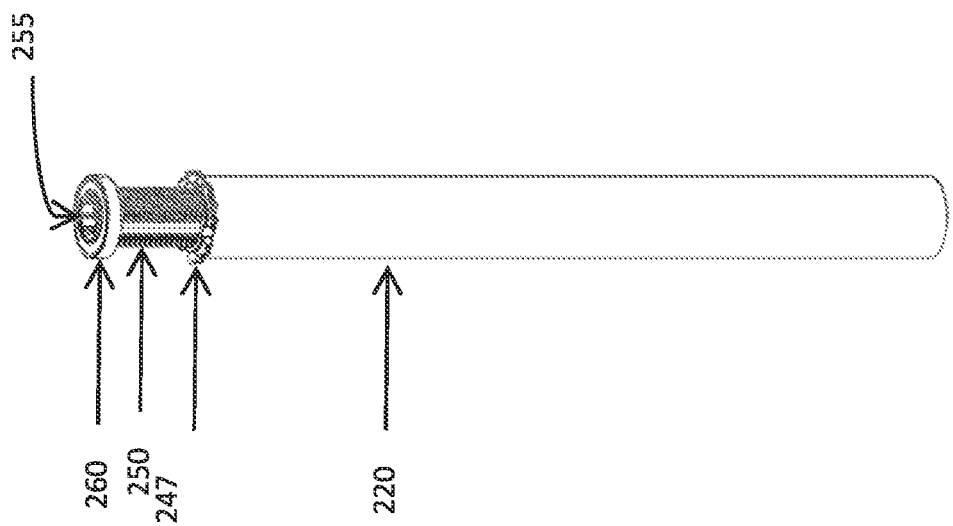

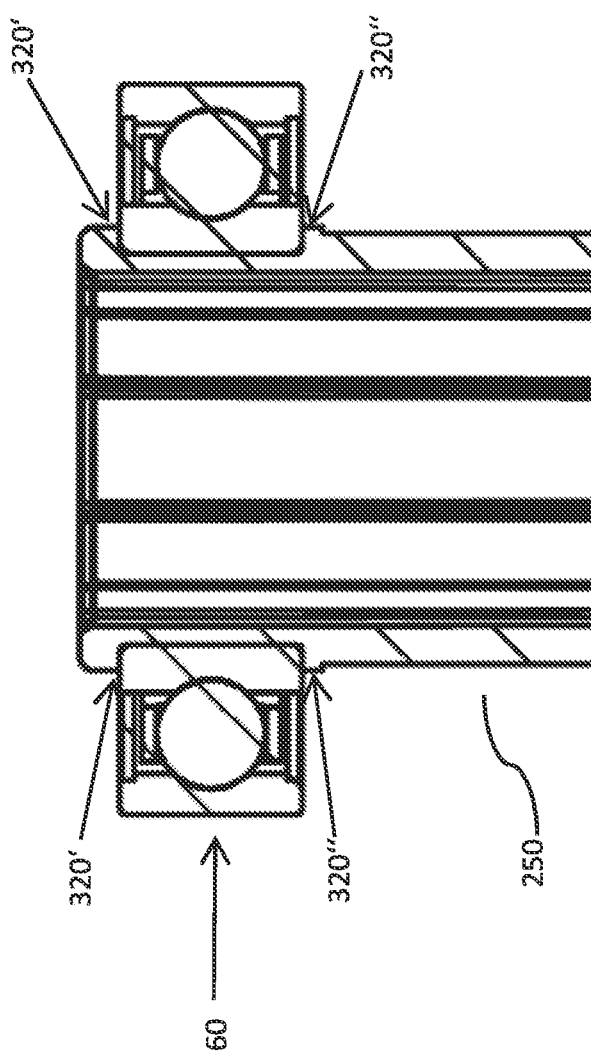
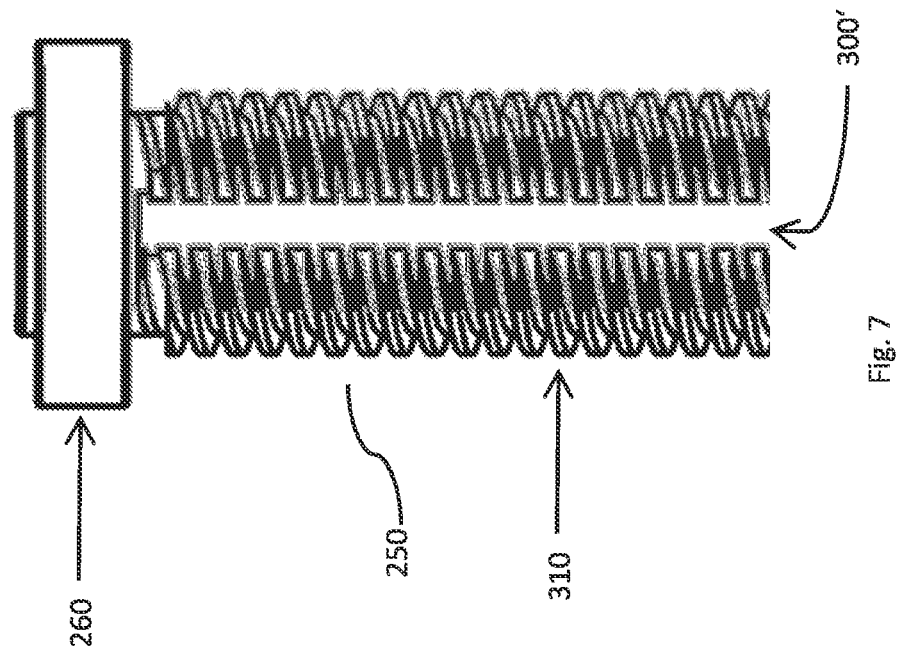

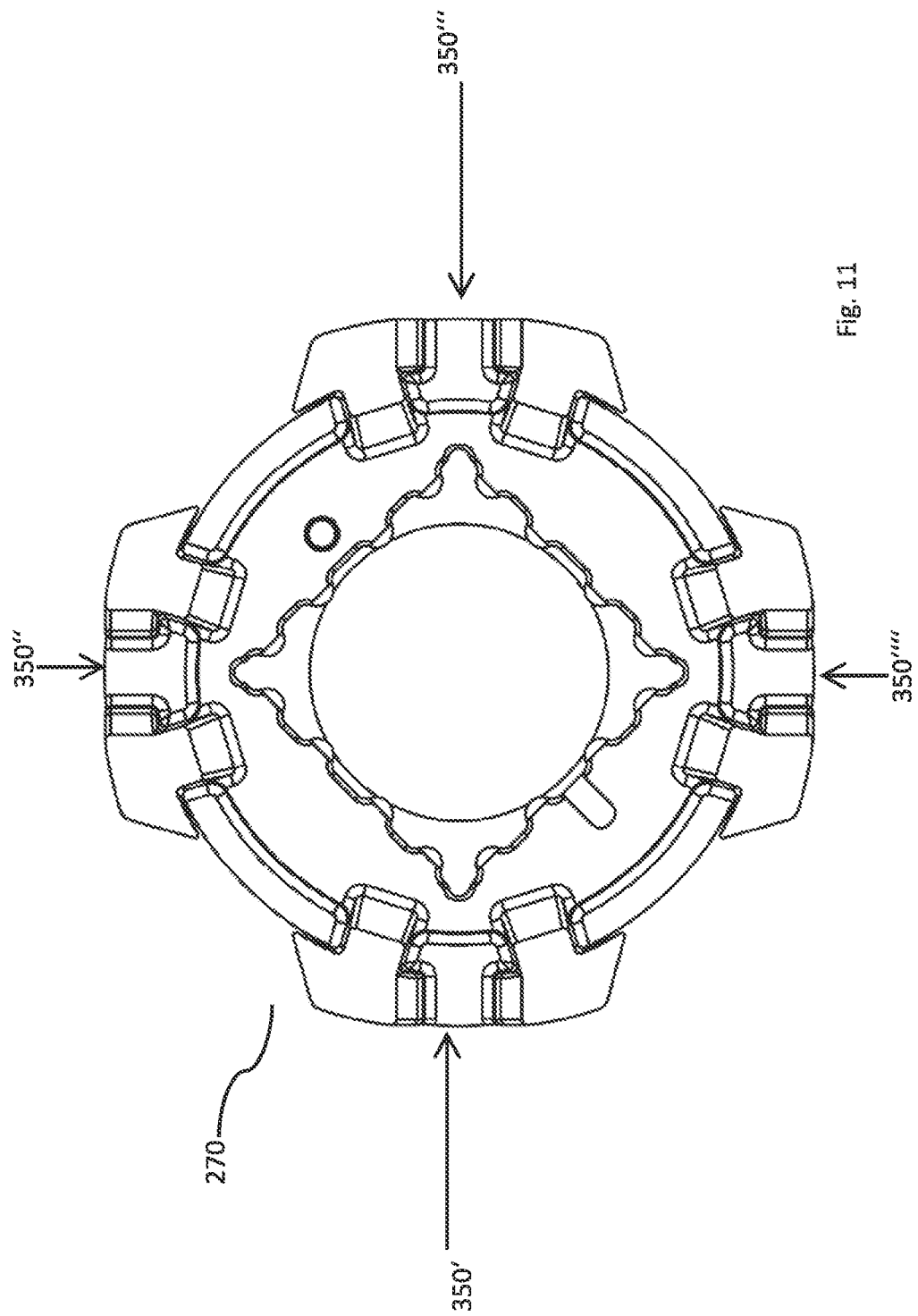

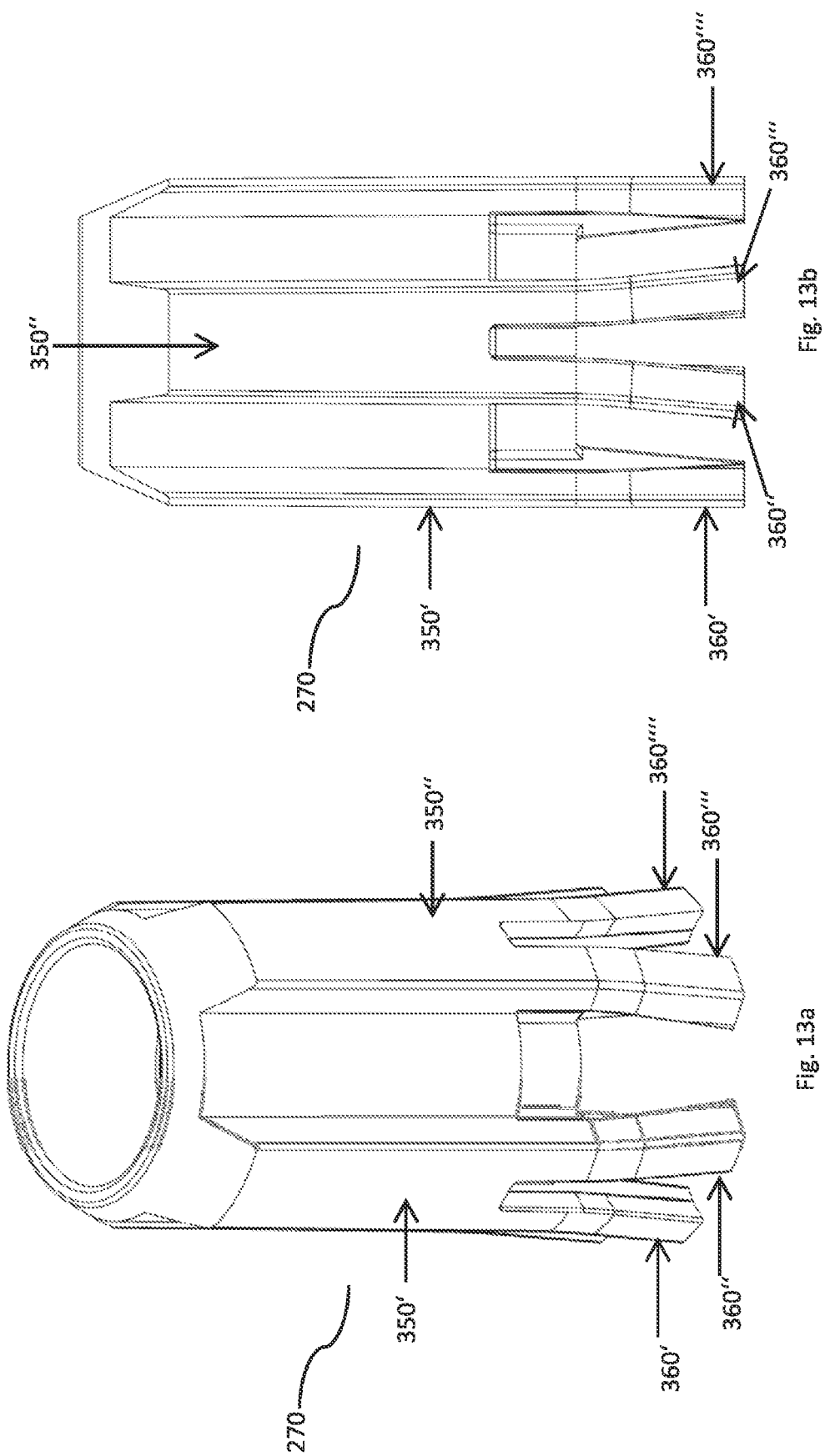

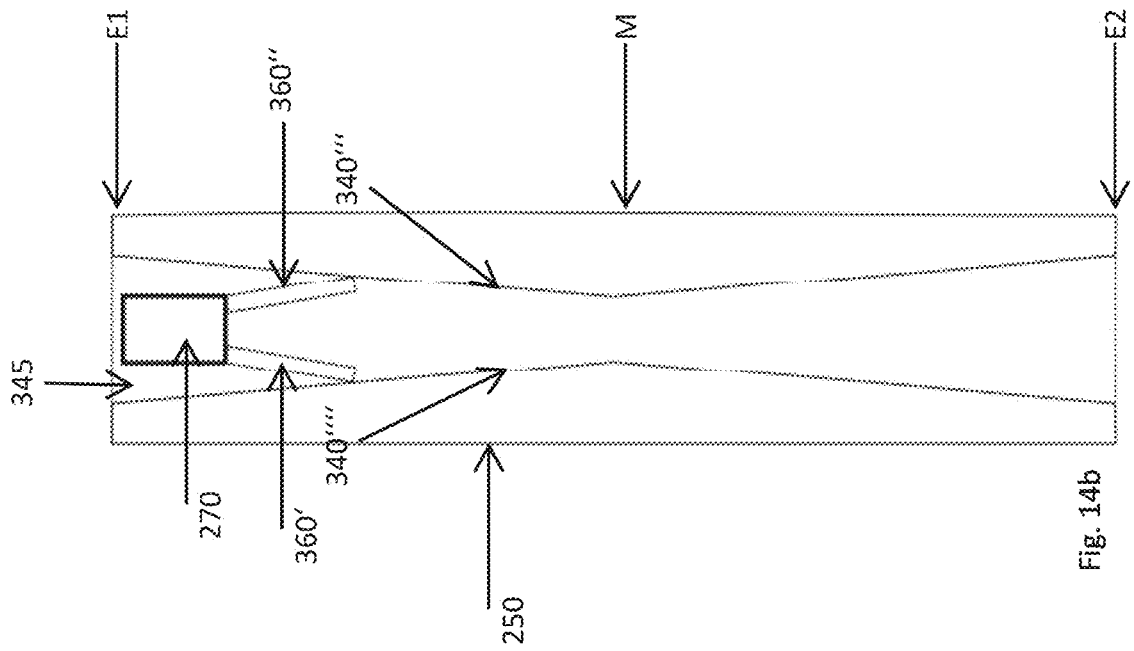
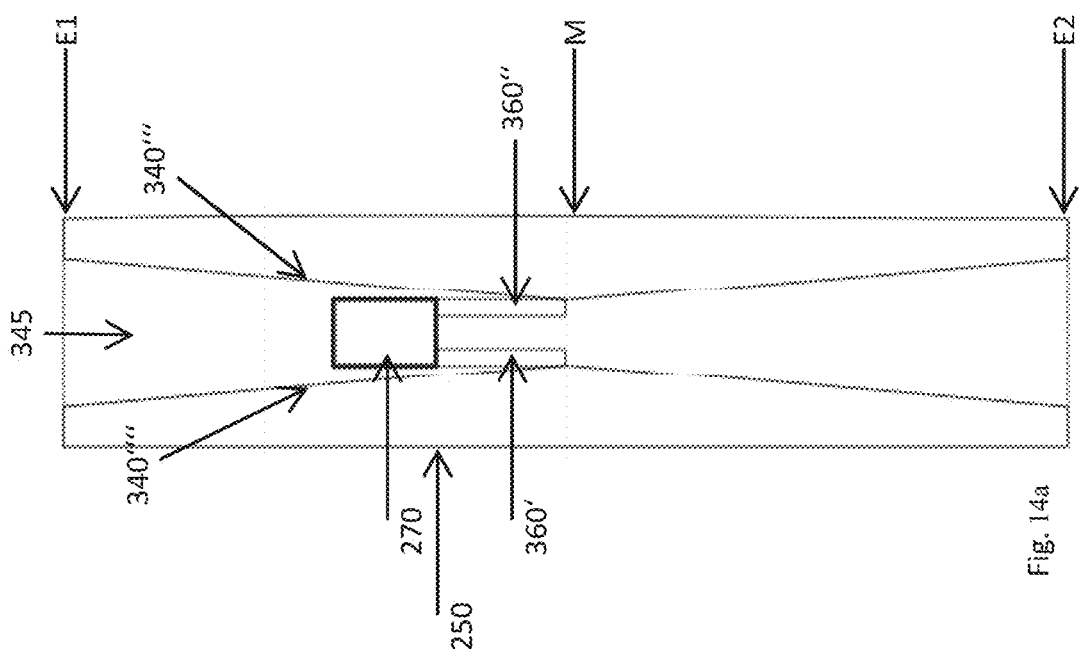

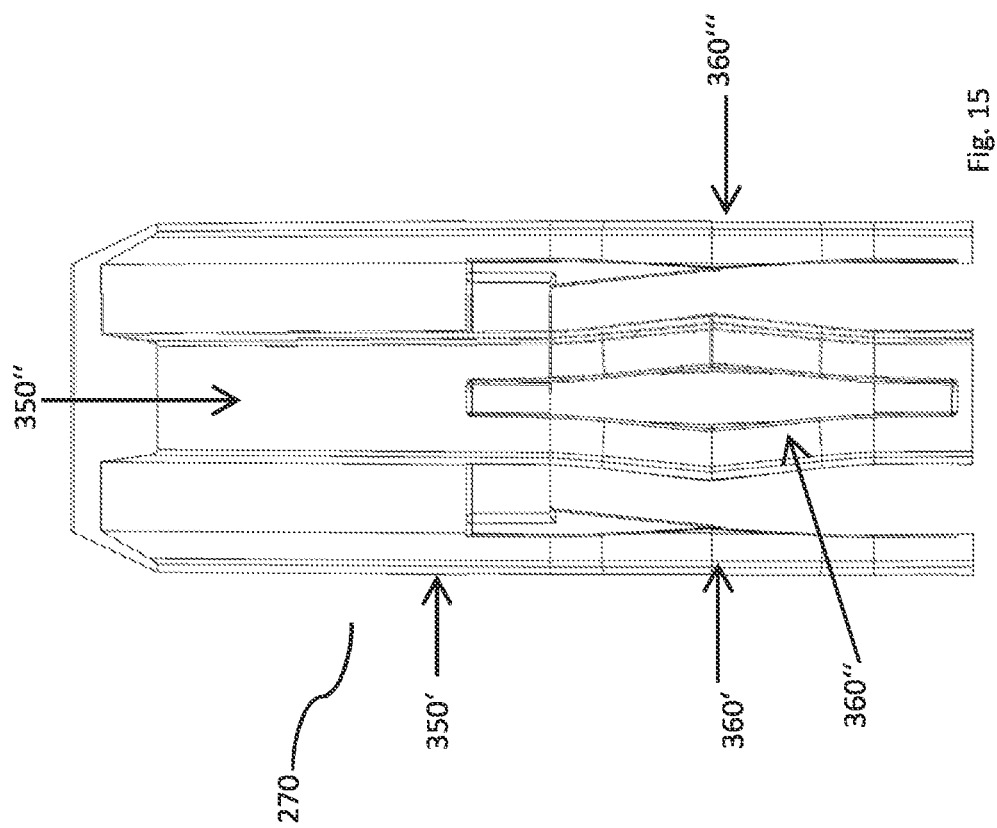

SPINDLE SYSTEM, LINEAR ACTUATOR AND PIECE OF FURNITURE

REFERENCE TO RELATED APPLICATIONS

This application claims priority to German Application number 10 2022 120 890.7, filed on Aug. 18, 2022. The contents of the above-referenced patent applications are hereby incorporated by reference in their entirety.

FIELD

The present disclosure relates to a spindle system with a hollow spindle for a linear actuator, in particular for a telescopic lifting column of a height-adjustable furniture leg. Furthermore, the present disclosure relates to a linear actuator with such a spindle system and to a piece of furniture with such a linear actuator.

BACKGROUND

Telescopic lifting columns are used, for example, as height-adjustable table legs and have a linear actuator with a multi-stage spindle drive with a plurality of spindles, in particular two spindles. The spindle drive is usually surrounded by several tubular profiles that can be retracted into one another and can be moved relative to one another along their longitudinal axis by the spindle drive.

SUMMARY

A linear actuator according to the present disclosure comprises at least one drive, preferably electric, and a telescopic tube system surrounding a spindle system, wherein the telescopic tube system comprises an outer tube and at least one inner tube arranged coaxially to the outer tube and at least partially surrounded by the outer tube. Optionally, the linear actuator may also comprise a gearbox, in particular a planetary gearbox and/or a brake.

In such a linear actuator, a rotational movement of the spindle system, for example, does not cause a rotational movement of the outer tube. The rotational movement of the spindle system causes, for example, a translational movement of the outer tube in the axial direction.

For example, such a telescopic tube system with a spindle system may have the following structure:

An inner shaft is connected to the drive. The inner shaft is located inside a hollow spindle.

In one embodiment, the inner shaft may be, for example, a drive spindle on which a drive spindle nut is mounted. In this embodiment, the drive spindle nut includes a retainer for an outer tube. In addition, a hollow spindle is attached to the drive spindle nut via a bearing, in particular a ball bearing or plain bearing, which serves to transmit axial forces, in particular to transmit thrust or tensile forces, between the hollow spindle and the outer tube. The hollow spindle has a bearing seat for the bearing.

The hollow spindle is axially displaceably connected to the inner shaft of the spindle system by one or more tappets and has a hollow spindle nut. The hollow spindle nut has a retainer for the inner tube and the outer tube. The holder is non-rotatably connected to the inner tube and non-rotatably connected to the outer tube.

The hollow spindles used in common spindle systems are typically metallic hollow spindles, for example made of aluminum, especially rolled aluminum. Such spindles are expensive and have a higher weight than, for example, plastic.

The present disclosure provides an improved spindle concept that reduces inadequacies in conventional spindle systems.

A linear actuator according to the present disclosure comprises at least one drive, preferably electric, and a telescopic tube system surrounding a spindle system, wherein the telescopic tube system comprises an outer tube and at least one inner tube arranged coaxially to the outer tube and at least partially surrounded by the outer tube. Optionally, the linear actuator may also comprise a gearbox, in particular a planetary gearbox and/or a brake.

In such a linear actuator, a rotational movement of the spindle system, for example, does not cause a rotational movement of the outer tube. The rotational movement of the spindle system causes, for example, a translational movement of the outer tube in the axial direction.

A bearing is set up to transmit axial forces, in particular shear or tensile forces, between a hollow spindle and the outer tube.

The improved spindle concept is based on the finding that advances in plastics now make it possible to achieve the necessary strength of the hollow spindle with a simultaneously small diameter even with a design in plastic. Accordingly, the hollow spindle is made of plastic, in particular in a casting process.

In one embodiment of a spindle system with a hollow spindle for a linear actuator according to the improved spindle concept, the hollow spindle at least partially surrounds an inner shaft of the spindle system. The hollow spindle is moreover connected to the inner shaft of the spindle system by one or more tappets of a positive and axially displaceable shaft-hub connection, which is located in particular on an inner side of the hollow spindle. The hollow spindle has a bearing seat for the bearing and an external thread on an outer side. Herein, the external thread of the hollow spindle, the one or more tappets of the hollow spindle and the bearing seat are made of a single casting and consist of the same plastic or are made of the same plastic.

By using plastic for the hollow spindle, the weight of the spindle system can be kept low. In addition, such a spindle system as well as a linear actuator with such a spindle system can be manufactured more cost-effectively.

The shaft-hub connection is formed by profiling the inner shaft and profiling the inside of the hollow spindle. The profiling of the inner shaft and the profiling of the inside of the hollow spindle are each produced by one or more tappets. For example, the tappets are each in the form of ribs, wedges, teeth or out-of-round profiles, which can engage with one another, for example, to produce the positive connection.

The shaft-hub connection thus comprises, for example, one or more tappets, for example ribs, on the inside of the hollow spindle and a sliding element which is connected to the inner shaft in a rotationally fixed manner and also comprises one or more tappets. The one or more tappets of the sliding element transmit torque to the hollow spindle via the one or more tappets of the hollow spindle.

For example, each of the tappets of the profiling of the inside of the hollow spindle has two flanks, the distance between which varies in the axial direction of the hollow spindle. By varying the distance, such as a narrowing starting from one end of the hollow spindle, the mold can be more easily guided out of the inside of the hollow spindle in an injection molding process when the molding process is complete.

The hollow spindle has a first end and a second end in the axial direction. For example, each of the tappets of the profiling of the inside of the hollow spindle has two flanks, whose distance from one another between the first and second ends, in particular in the middle of the hollow spindle, is smaller than at the first and second ends of the hollow spindle.

In other embodiments, the distance between the two flanks decreases steadily, starting from the first end toward the second end or vice versa.

In various embodiments, an inner diameter of the hollow spindle varies between opposing tappets of the profiling of the inside of the hollow spindle in the axial direction of the hollow spindle.

For example, the inner diameter between opposing tappets of the profiling of the inside of the hollow spindle is smaller between the first and second ends, particularly at the center of the hollow spindle, than at the first and second ends of the hollow spindle.

In other embodiments, the inner diameter decreases steadily, starting from the first end towards the second end or vice versa. Preferably, the inner diameter changes the same as the distance between the flanks.

In various embodiments, the one or more tappets of the profiling of the inner shaft are formed by tappets on a sliding element that is non-rotatably connected to the inner shaft, such as by being swaged onto the shaft.

For example, the sliding element has one or more elastic compensating elements that nestle against the tappets of the hollow spindle to minimize radial play between the one or more tappets of the sliding element and the one or more tappets of the hollow spindle over an entire length of the hollow spindle. This results in improved power transmission and reduced noise. For example, each of the one or more resilient balancing elements nestles laterally against the flanks of the tappets of the hollow spindle.

Each of the one or more elastic compensating elements may include one or more, such as two, legs that are spaced apart and elastic. Alternatively, each of the one or more resilient compensating elements may comprise a resilient self-contained portion, such as annular or elliptical.

In various embodiments, the bearing seat of the hollow spindle has an axial stop on both sides with respect to the inner ring of a rolling bearing or with respect to a sliding bearing, in particular a disk-shaped sliding bearing, the bearing being formed by the rolling bearing or the sliding bearing. In this case, for example, there is a material connection between at least part of the bearing and the axial stop on both sides of the bearing seat of the hollow spindle.

For example, an inner ring of a rolling bearing is at least partially overmolded with the plastic of the hollow spindle. Alternatively, an inner ring of a rolling bearing, such as an inner ring made of plastic, is fused to the bearing seat. In one embodiment of the bearing as a plain bearing, for example, the plain bearing is at least partially overmolded with the plastic of the hollow spindle.

In various embodiments, the external thread of the hollow spindle is interrupted in two circumferential regions of the hollow spindle, which extend over an entire axial length of the external thread and are arranged diametrically to one another with respect to the hollow spindle axis. By interrupting the thread profile of the hollow spindle into two diametrically arranged axially extending circumferential regions, it is possible to manufacture the spindle by two mold halves, with the mold parting surface of the injection mold extending in an axial plane of the spindle that axially intersects the circumferential regions in which the thread profile is missing.

For example, the hollow spindle has an axis-parallel flattening in the area of a parting plane on its outer circumference. This also enables simplified manufacture and a tolerance to any minor inaccuracies that may arise in the parting plane at the mold parting line of the two mold halves.

A linear actuator according to the improved spindle concept can be formed with a spindle system according to one of the described embodiments. Therein, the linear actuator comprises a telescopic tube system surrounding the spindle system, wherein the telescopic tube system comprises an outer tube and at least one inner tube arranged coaxially to the outer tube and at least partially surrounded by the outer tube. A bearing is arranged for transmitting axial forces, in particular for transmitting thrust or tensile forces, between the hollow spindle of the spindle system and the outer tube. A rotary movement of the spindle system does not cause a rotary movement of the outer tube.

Such a linear actuator can be installed in a piece of furniture, such as a table, but also in a bed.

The improved spindle concept is explained in more detail below by means of embodiment examples with reference to the drawings. Here, similar elements or elements with the same functions are designated with the same reference signs. Therefore, a repeated explanation of individual elements may be omitted.

BRIEF DESCRIPTION OF THE DRAWINGS

Shown herein, in part simplified:

FIG. 1 illustrates an embodiment of a table with two telescopic columns;

FIG. 5 illustrates a further detail of the spindle system of FIG. 2;

FIG. 6 illustrates another detail of the spindle system of FIG. 2;

FIG. 7 illustrates details of one embodiment of the hollow spindle;

FIG. 8 illustrates a cross-section through the hollow spindle of FIG. 7 with bearing seat and bearing;

FIG. 11 is a top view of one embodiment of a sliding element;

FIG. 12b is a cross-section through the view in FIG. 12a;

FIG. 13a illustrates an embodiment of a sliding element with compensating elements;

FIG. 13b illustrates another view of the sliding element of FIG. 13a;

FIG. 14a illustrates a representation of an embodiment of a sliding element in a groove;

FIG. 14b illustrates a further embodiment of a sliding element in a groove; and FIG. 15 illustrates a further embodiment of a sliding element.

DETAILED DESCRIPTION

FIG. 1 shows an electrically height-adjustable table 100 with, for example, two columns 110, 110'. Each column 110, 110' is connected to a table base 120, 120' and table top 130. Each column 110, 110' includes a three-stage telescopic housing with coaxial profile tubes and a linear actuator (not shown in FIG. 1).

Figure 2:
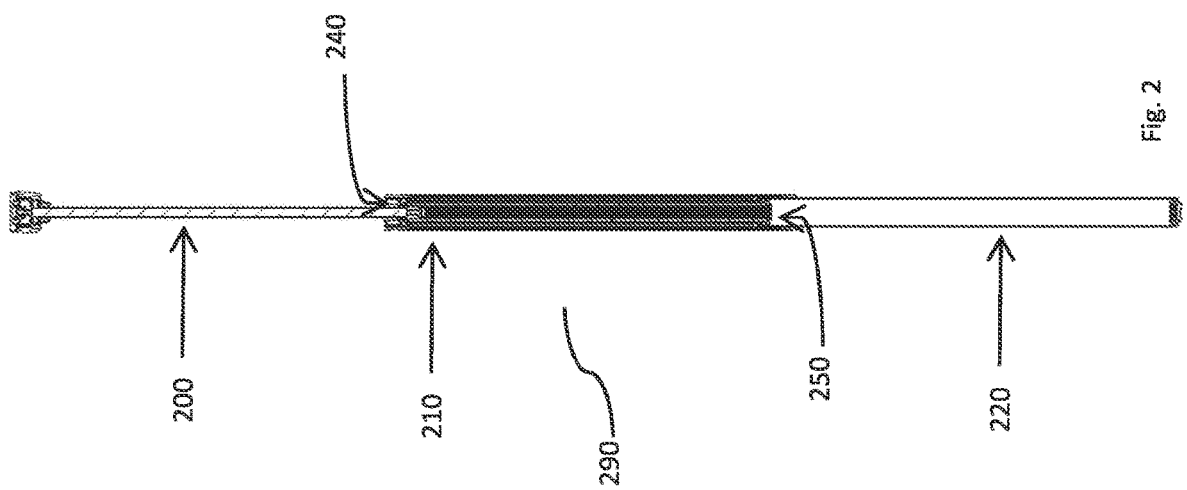
FIG. 2 illustrates an embodiment of a spindle system in the extended state.

FIG. 2 shows an example of a spindle system 290 with an inner shaft 200, a hollow spindle 250, and an inner tube 220, each located within the outer tube 210. The spindle system in FIG. 2 is shown in the extended state.

Figure 3:
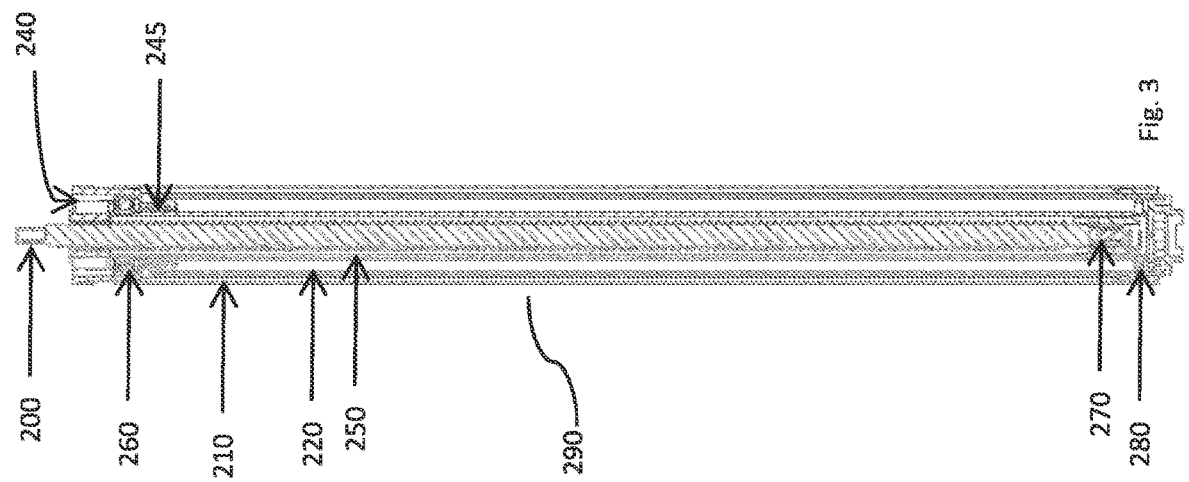
FIG. 3 illustrates an embodiment of a spindle system in the retracted state.

FIG. 3 also shows the spindle system 290 of FIG. 2 in a slightly enlarged view and in the retracted state. A drive spindle nut 240 and a bearing, in this example a ball bearing 260, which are required for mounting the outer tube 210, can be seen.

The hollow spindle 250 has a sliding guide 280 at one end for the inner tube 220, which is non-rotatably connected to the hollow spindle 250. The inner tube 220 is smooth on the inside, and the sliding guide 280 allows rotational movement of the inner tube 220 relative to the hollow spindle 250.

A sliding element 270 is provided at the lower end of the inner shaft 200, which provides a positive and axially displaceable connection to the hollow spindle 250. With a drive, such as an electric motor, at the upper end of the shaft 200, the result is a linear actuator.

Figure 4:
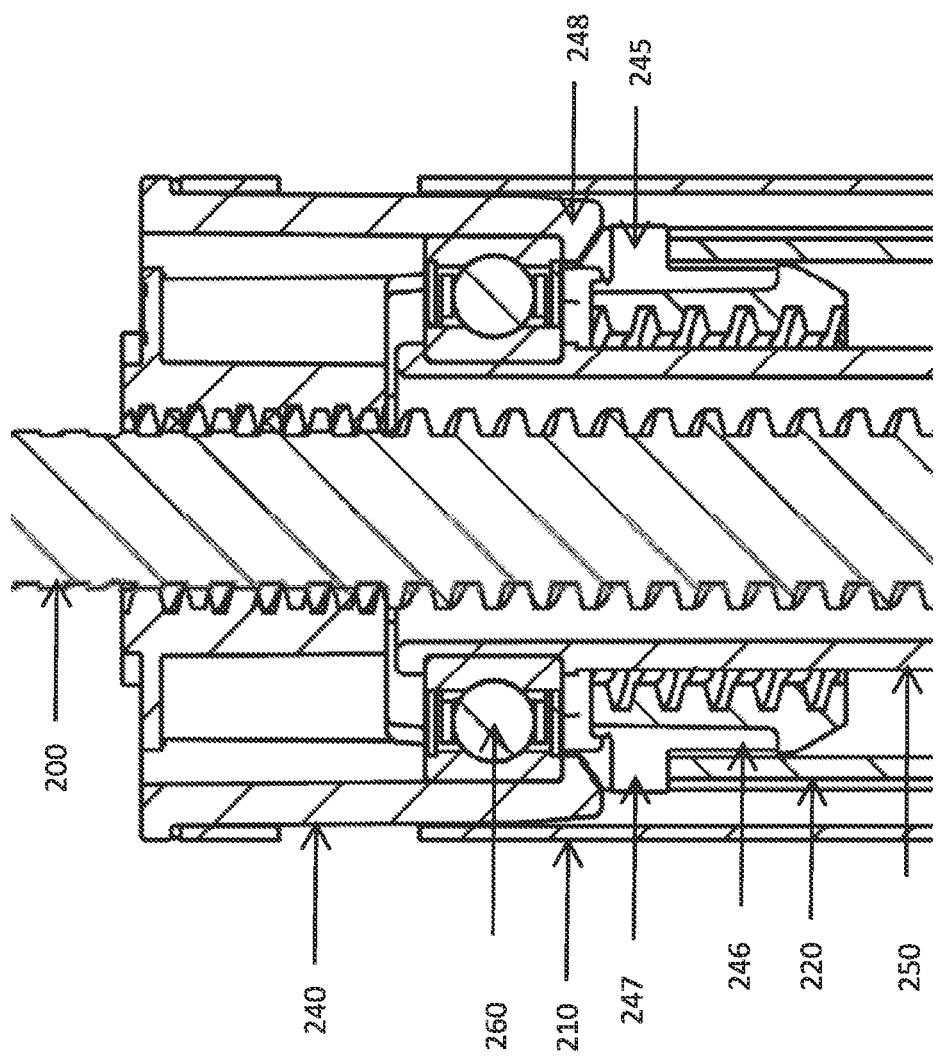
FIG. 4 illustrates a detail of the spindle system of FIG. 2.

FIG. 4 shows an enlarged view of the spindle system 290 from FIG. 2 and FIG. 3 in the area of the hollow spindle nut 245.

The hollow spindle 250 has a hollow spindle nut 245. The hollow spindle nut 245 includes a retainer 246 for non-rotatably mounting the inner tube 220 and a retainer 247 for non-rotatably mounting the outer tube 210. The retainer 247 for non-rotational mounting of the outer tube 210 is ribbed and engages a ribbing on the inner surface of the outer tube 210. The retainer 246 for non-rotational mounting of the inner tube 220 includes a shoulder onto which the inner tube 220 is fitted.

The drive screw nut 240 has a shoulder for mounting the outer tube 210. The drive screw nut 240 includes grippers or snappers 248 to engage around the ball bearing 260 to hold the hollow spindle 250 to the drive screw nut 240.

Once the outer tube 210 is in place, the outer tube 210 rests against the grippers or snappers 248, preventing the snapper 248 from bending and thereby preventing the ball bearing 260 from separating from the snapper 248.

FIG. 5 shows a detailed view of the hollow spindle 250 with the ball bearing 260. The hollow spindle 250 and the ball bearing 260 are fixed to each other. The ball bearing 260 allows the outer tube 210 (not shown here) to be rotatably supported. Thus, rotation of the hollow spindle 250 within the outer tube 210 is enabled.

The hollow spindle 250 has one or more tappets, e.g. ribs or knobs 255 on its inner side, in which correspondingly shaped tappets on the outer side of the sliding element 270 (not visible here, see FIG. 11) engage and transmit the torque of the inner shaft 200 to the hollow spindle 250.

In FIG. 5, the inner tube 220 is mounted to the hollow spindle nut 245. The outer tube 210 is not mounted, but the bracket 247 for the outer tube can be seen.

In FIG. 6, the inner shaft 200 is visible with a sliding element 270 attached to the inner shaft 200. The sliding element 270 is attached to the end remote from the drive and includes one or more tappets (better seen in FIG. 11), such as ribs. The sliding element 270 is connected to the inner shaft 200 in a rotationally fixed but axially displaceable manner. The tappets of the sliding element 270 transmit torque to the hollow spindle 250 via one or more tappets 255, more visible in FIG. 5, on the inner side of the hollow spindle 250. The sliding element 270 engages the tappets 255 on the inner side of the hollow spindle 250 and forms an axially displaceable, positive shaft-hub connection between the inner shaft 200 of the spindle system and the hollow spindle 250.

FIG. 7 shows a side view of the hollow spindle 250. The hollow spindle has a bearing 260, which in the embodiment shown is designed as a ball bearing.

The hollow spindle is manufactured by an injection mold, which has two mold halves that are joined together in a parting plane. The two mold halves form a thread profile 310 on the outer circumference. The thread profile 310 is interrupted in two circumferential regions by a flattening 300', 300" in each case. FIG. 7 shows only the front of the two flattenings. The second flattening is located on the rear side of the hollow spindle, which is not visible. The two circumferential areas run axially parallel, extend over the entire length of the thread and are arranged diametrically to each other.

In the area in which the parting line axially intersects the hollow spindle 250, the thread profile is flattened in each case parallel to the axis. These flattenings 300', 300" thus accommodate any minor inaccuracies that may occur in the parting line at the mold parting line of the two mold halves. The gating points for injection of the plastic into the mold are also located in the areas of the flattenings 300', 300".

As a result, the spindle with the plastic thread does not have to be removed from the injection mold in a time-consuming manner by rotating the spindle axially out of the mold. By interrupting the thread profile of the hollow spindle into two diametrically arranged axially extending circumferential areas, it is possible to produce the spindle by means of two mold halves, with the mold parting surface of the injection mold running in an axial plane of the spindle that axially intersects the circumferential areas in which the thread profile is missing. With respect to the plane of the mold parting surface, the thread profile 310 has no undercut due to the flattenings 300', 300", so that the mold tool can be separated and demolded in this parting surface.

FIG. 8 shows a cross-section through the hollow spindle. Prior to the injection process, the bearing 260 is inserted into the mold tool in order to produce the bearing 260 and the hollow spindle 250 in one step and from one casting. During the injection process, the bearing 260 is firmly bonded to the plastic of the hollow spindle by injecting the plastic compound to the outer surface of the insert. After curing, both the hollow spindle and the bearing seat with axial stops 320', 320" on both sides for the bearing have been produced during the same injection process. The bearing is overmolded from the same plastic from which the hollow spindle is molded. The axial stops 320', 320" extend circumferentially along the outer surface of the hollow spindle 250.

In one embodiment, the bearing 260 may be formed as a ball or roller bearing that is fixedly bonded 250 to the plastic of the hollow spindle after injection.

In one embodiment, an inner race, particularly a metallic inner race, of the ball or roller bearing is at least partially overmolded with the plastic of the hollow spindle 250.

In one embodiment, an inner ring of the ball or roller bearing comprising plastic is fused to the bearing seat.

In one embodiment, the bearing 260 may be formed as a plain bearing (not shown) that is permanently bonded to the plastic of the hollow spindle 250 after injection molding.

The injection mold includes, in addition to the two mold halves, one or two steel cores around which plastic is injected during the injection process. The one or two steel cores are removed after the injection process to leave the hollow interior of the hollow spindle. The one or two steel cores have a profiling on their outer surface that creates the profiling 330 shown in FIG. 9 on the inner surface of the hollow spindle 250.

The profiling 330 of the inside of the hollow spindle includes one or more tappets 255', 255", 255''', 255''''. These tappets may be in the form of ribs, wedges, teeth, or out-of-round profiles, for example.

Each tappet 255', 255", 255''', 255'''' has two flanks 340', 340" respectively.

Figure 9:
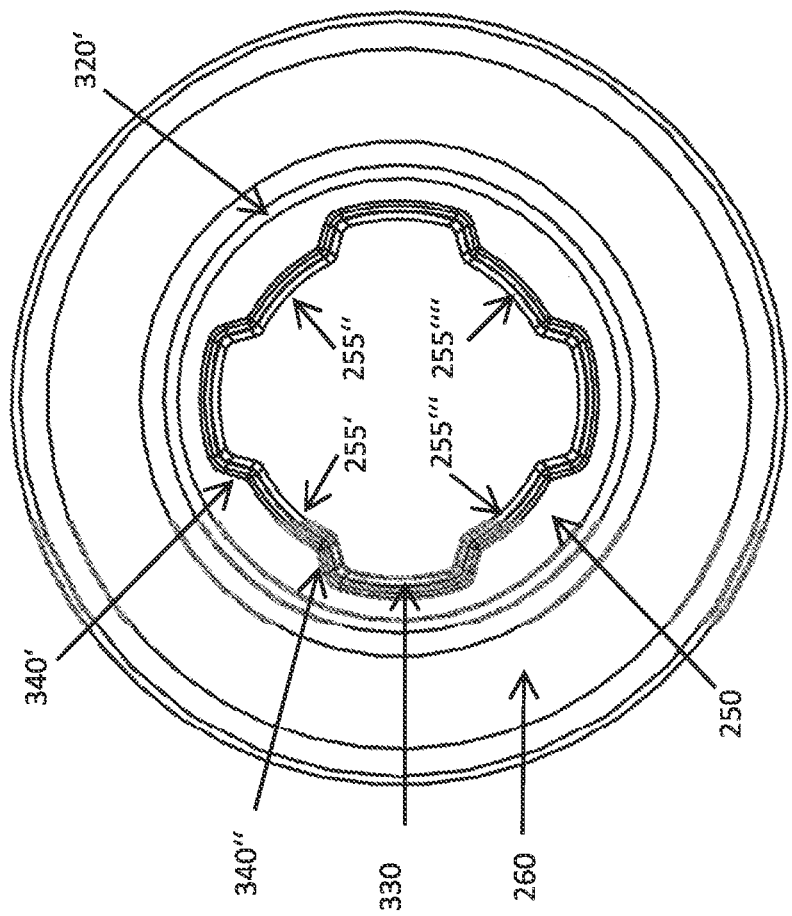
FIG. 9 is a top view of the hollow spindle of FIG. 7 showing the profiling of the inside of the hollow spindle.

FIG. 9 shows a top view of the hollow spindle and, in addition to the profiling, also shows one side of a ball bearing with one of the two axial, circumferential and uninterrupted stops 320'.

Figure 10:
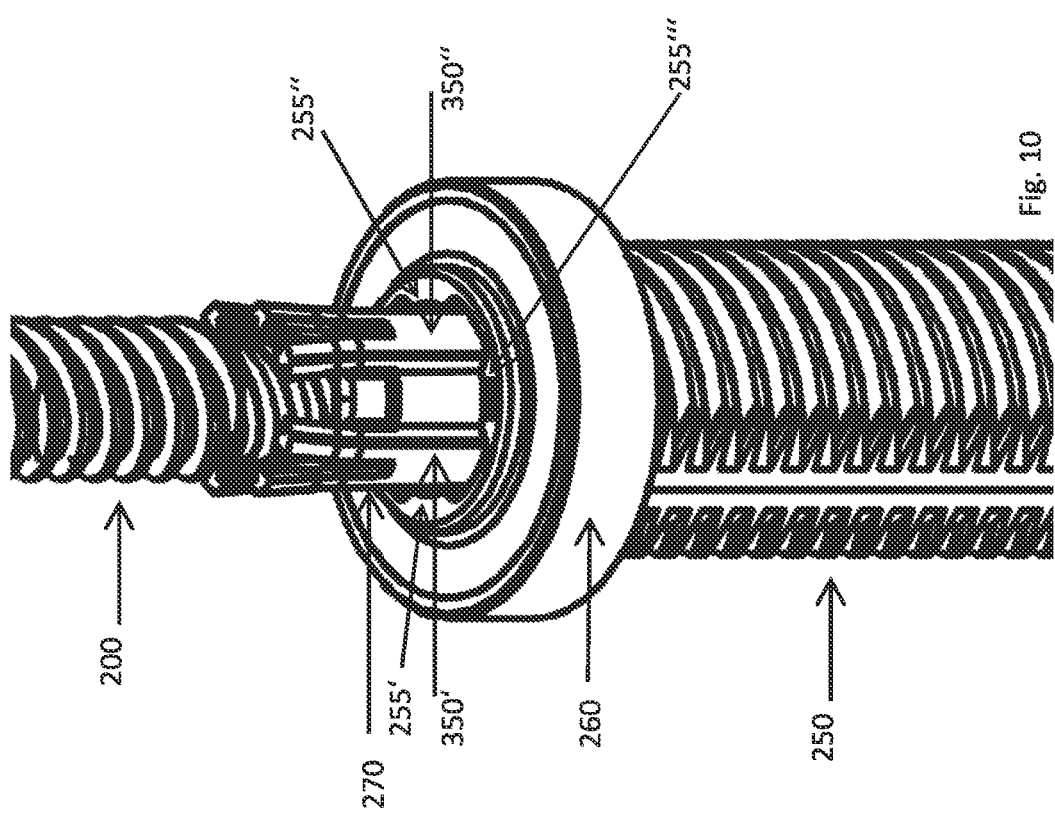
FIG. 10 is a representation of an exemplary shaft-hub connection between the inner shaft with its sliding element and the hollow spindle.

FIG. 10 shows, in addition to the hollow spindle 250, a sliding element 270 with a profiling of the outer side, which has one or more tappets 350', 350", which engage in the tappets 255', 255", 255''', 255'''' of the profiling of the inner side of the hollow spindle and produce an axially displaceable, positive shaft-hub connection between the hollow spindle 250 and the inner shaft 200 with the aid of the sliding element 270, which is connected thereto in a rotationally fixed manner.

FIG. 11 shows a top view of an embodiment of a sliding element 270. This embodiment comprises, for example, four tappets 350', 350", 350''', 350''''. Each tappet has two flanks analogous to the tappets of the hollow spindle.

The sliding element 270 is pushed onto the inner shaft 200 and pressed, for example.

Figure 12B:
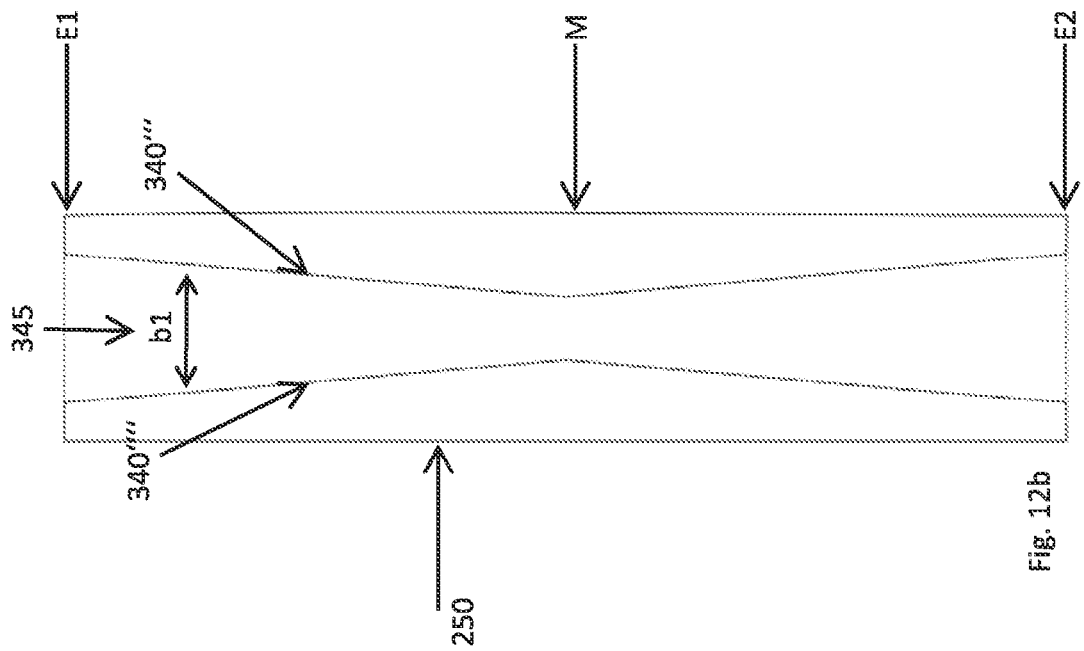
Figure 12A:
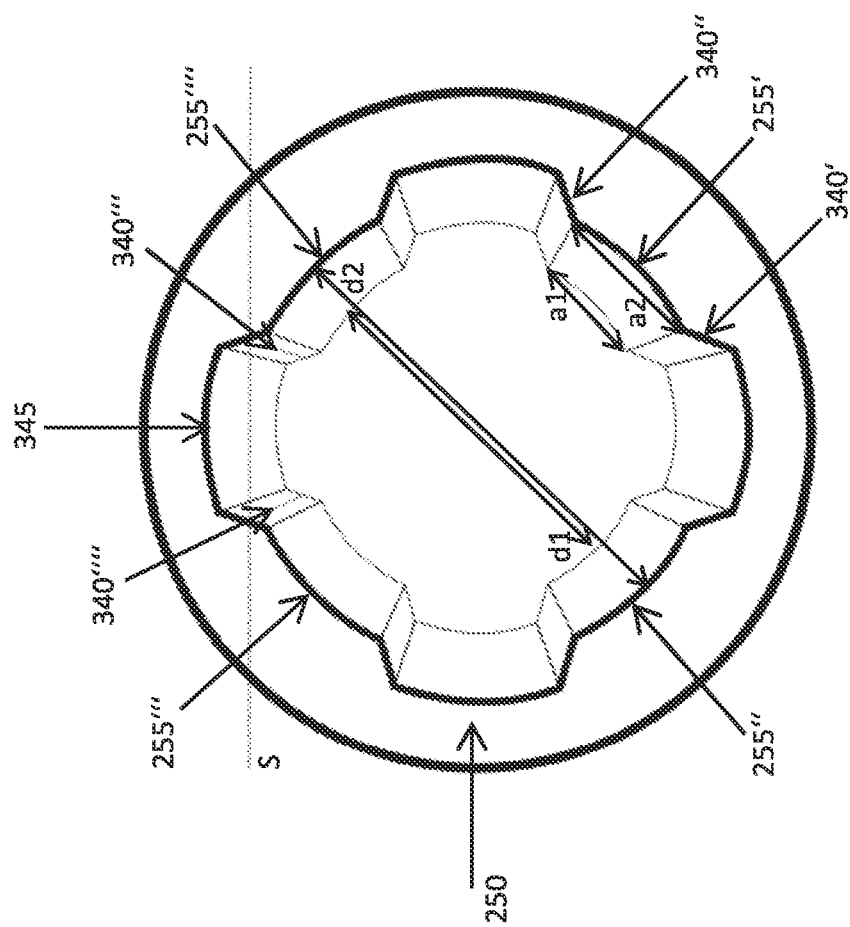
FIG. 12a is another top view of the hollow spindle of FIG. 7.

FIG. 12a shows a view of the profiling of the hollow spindle 250 with the one or more tappets 255', 255", 255''', 255''''. The view is not to scale for ease of viewing.

With reference to a tappet 255' of the one or more tappets of the hollow spindle, it is shown that the two flanks 340' and 340" of the tappet 255' have a varying distance a1, a2 along the length of the hollow spindle, i.e. along the axial direction.

In one embodiment, the distance a1 between the flanks 340', 340" of the tappet 255' at the center of the hollow spindle 250 is less than the distance a2 at each of the two ends of the hollow spindle 250.

In an analogous manner, all of the tappets 255', 255", 255''', 255'''' have such a varying distance between their respective flanks.

In a further embodiment, the inner diameter between any two opposing tappets 255", 255''' of the profiling of the inside of the hollow spindle varies along the length of the hollow spindle 250.

In particular, the inner diameter d1 at the center of the hollow spindle is less than the inner diameter d2 at each of the two ends of the hollow spindle 250. For example, the inner diameter in each case reduces steadily from the outer ends of the hollow spindle 250 toward the center, thus becoming steadily smaller.

Because of the varying distances between the flanks of the tappets 255', 255", 255''', 255'''', the width of the grooves between the tappets also varies. Using a groove 345 as an example, FIGS. 12a and 12b show how the width of the groove 345 extends.

FIG. 12b shows a cross-section along the section plane S from FIG. 12a. The width of the groove 345 is larger in the area of the two ends of the hollow spindle E1, E2 than in the center M of the hollow spindle 250. The width of the groove 345 reduces continuously in each case from the outer ends E1, E2 of the hollow spindle 250 toward the center M, i.e. it becomes steadily smaller.

This applies in an analogous manner to all grooves of the profiling of the hollow spindle 250.

The one or more tappets 255', 255", 255''', 255'''' and the one or more grooves 345 of the profiling 330 of the inside of the hollow spindle 250 are formed by one or two steel cores around which plastic is injected during the injection molding process. Due to the shown varying distances, widths and diameters of the one or more grooves and one or more tappets, it is possible to pull the one or two steel cores out of the hollow spindle 250 after the injection process.

FIG. 12b shows the progression of the width of the groove based on a groove 345, as created by the preferred use of two steel cores in the injection process. The course of the width of a groove resembles the shape of two isosceles trapezoids mirrored to each other. The first steel core extends from the first end E1 to the center M of the hollow spindle during the injection process. The second steel core extends from the second end E2 to the center M of the hollow spindle 250.

Alternatively, only one steel core can be used. In this case, however, the slot width at one end of the hollow spindle is larger, in particular twice as large, than when two steel cores are used. This increases the minimum achievable diameter of the hollow spindle and thus the diameter of the linear actuator, or the lifting column.

In order to achieve a positive shaft-hub connection between the sliding element 270 and the hollow spindle 250 over the entire axial displacement range of the sliding element 270 despite the different width ratios along the grooves, the sliding element 270 has in one embodiment one or more elastic compensating elements 360', 360", 360''', 360'''' to minimize radial play between the one or more tappets 350', 350", 350''', 350'''' of the sliding element and the one or more tappets 255', 255" 255''', 255'''' of the hollow spindle 250 along the entire length of the hollow spindle 250.

FIGS. 13a and 13b show an embodiment of a sliding element 270 with one or more elastic compensating elements 360', 360", 360''', 360'''' in different views.

The one or more elastic compensating elements 360', 360", 360''', 360'''' each lie in a groove 345 of the profiling of the hollow spindle 250 and nestle laterally against two flanks 340''', 340'''' of the tappets of the hollow spindle, as shown in FIGS. 14a and 14b. FIG. 14a and FIG. 14b show the sliding element 270 at two different positions of the axial displacement range of the sliding element. In the region of the center M of the hollow spindle, the elastic compensating elements 360', 360", 360''', 360'''' are pressed further towards each other than in the end regions, e.g. E1.

In one embodiment, each of the one or more compensating elements 360', 360", 360''', 360'''', as shown in FIGS. 13a and 13b, comprises one or more legs, in particular two legs, that are spaced apart and elastic.

In an alternative embodiment, each of the one or more compensating elements 360', 360", 360''', 360'''', as shown in FIG. 15, comprises an elastic, self-contained, in particular annular or elliptical portion.

What is claimed is:

1. A spindle system for a linear actuator, wherein the linear actuator has a telescopic tube system having an outer tube and at least one inner tube arranged coaxially with the outer tube and at least partially surrounded by the outer tube, the spindle system comprising:
- an inner shaft;
- a sliding element connected to the inner shaft in a rotationally fixed manner, wherein the sliding element comprises one or more first tappets associated with a first profiling of the inner shaft, wherein the sliding element further comprises one or more elastic compensating elements;
- a bearing; and
- a hollow spindle at least partially surrounding the inner shaft, wherein the telescopic tube system surrounds the hollow spindle, the hollow spindle comprising:
  - one or more second tappets associated with a second profiling of an inner side of the hollow spindle, wherein the hollow spindle is connected to the inner shaft by a positive and axially displaceable shaft-hub connection defined by the first profiling and the second profiling, wherein the one or more elastic compensating elements engage the one or more second tappets to minimize radial play between the one or more first tappets and the one or more second tappets over an entire length of the hollow spindle;
  - an outer side having an external thread; and
  - a bearing seat, wherein the bearing is seated in the bearing seat, and wherein the bearing is configured to transmit axial thrust forces or axial tensile forces between the hollow spindle and the outer tube, wherein a rotational movement of the spindle system does not cause a rotational movement of the outer tube, wherein the external thread, the one or more second tappets, and the bearing seat are formed as a single casting of a plastic material.

2. The spindle system according to claim 1, wherein the one or more second tappets are each in the form of a rib, a wedge, a tooth or a non-circular profile.

3. The spindle system according to claim 1, wherein each of the one or more second tappets comprises two flanks whose distance from one another varies in an axial direction of the hollow spindle.

4. The spindle system according to claim 1, wherein the hollow spindle has a first end, a middle, and a second end, and wherein each of the one or more second tappets has in each case two flanks whose distance from one another is smaller in the middle of the hollow spindle than at the first end and the second end of the hollow spindle.

5. The spindle system according to claim 1, wherein the one or more second tappets define an inner diameter of the hollow spindle, and wherein the inner diameter varies over an axial length of the hollow spindle.

6. The spindle system according to claim 5, wherein the hollow spindle has a first end, a second end, and a middle between the first end and the second end, wherein the inner diameter decreases from the first end to the middle and from the second end to the middle.

7. The spindle system according to claim 1, wherein each of the one or more elastic compensating elements laterally nestles against flanks of the one or more second tappets.

8. The spindle system according to claim 1, wherein each of the one or more elastic compensating elements comprises two legs that are spaced apart and elastic.

9. The spindle system according to claim 1, wherein each of the one or more elastic compensating elements comprises an elastic, self-contained annular or elliptical, portion.

10. The spindle system according to claim 1, wherein the bearing comprises one of a disk-shaped plain bearing or a roller bearing having an inner ring, wherein the bearing seat has an axial stop on each axial side of the inner ring of the rolling bearing or each axial side of the disk-shaped plain bearing.

11. The spindle system according to claim 10, further comprising a material connection between at least a part of the bearing and the axial stop on each axial side of the bearing seat.

12. The spindle system according to claim 11, wherein the inner ring is at least partially overmolded with the plastic material of the hollow spindle.

13. The spindle system according to claim 11, wherein the inner ring of the roller bearing is comprised of the plastic material of the hollow spindle and is fused to the bearing seat.

14. The spindle system according to claim 11, wherein the disk-shaped plain bearing is at least partially overmolded with the plastic material of the hollow spindle.

15. The spindle system according to claim 1, wherein the external thread of the hollow spindle is interrupted in two circumferential regions of the hollow spindle, wherein the two circumferential regions extend over an entire axial length of the external thread and are diametrically opposed to each other with respect to a hollow spindle axis.

16. The spindle system according to claim 1, wherein the hollow spindle has an axis-parallel flattening in a region of a parting plane at its outer circumference.

17. A linear actuator comprising:
- a telescopic tube system having an outer tube and at least one inner tube arranged coaxially with the outer tube and at least partially surrounded by the outer tube; and
- a spindle system comprising:
  - an inner shaft;
  - a sliding element connected to the inner shaft in a rotationally fixed manner, wherein the sliding element comprises one or more first tappets associated with a first profiling of the inner shaft, wherein the sliding element further comprises one or more elastic compensating elements;
  - a bearing; and
  - a hollow spindle at least partially surrounding the inner shaft, wherein the telescopic tube system surrounds the hollow spindle, the hollow spindle comprising:
    - one or more second tappets associated with a second profiling of an inner side of the hollow spindle, wherein the hollow spindle is connected to the inner shaft by a positive and axially displaceable shaft-hub connection defined by the first profiling and the second profiling, wherein the one or more elastic compensating elements engage the one or more second tappets to minimize radial play between the one or more first tappets and the one or more second tappets over an entire length of the hollow spindle;
    - an outer side having an external thread; and
    - a bearing seat, wherein the bearing is seated in the bearing seat, and wherein the bearing is configured to transmit axial thrust forces or axial tensile forces between the hollow spindle and the outer tube, wherein a rotational movement of the spindle system does not cause a rotational movement of the outer tube, wherein the external thread, the one or more second tappets, and the bearing seat are formed as a single casting of a plastic material.

18. A piece of furniture comprising a linear actuator, the linear actuator comprising:

a telescopic tube system having an outer tube and at least one inner tube arranged coaxially with the outer tube and at least partially surrounded by the outer tube; and a spindle system comprising:
- an inner shaft;
- a sliding element connected to the inner shaft in a rotationally fixed manner, wherein the sliding element comprises one or more first tappets associated with a first profiling of the inner shaft, wherein the sliding element further comprises one or more elastic compensating elements;
- a bearing; and
- a hollow spindle at least partially surrounding the inner shaft, wherein the telescopic tube system surrounds the hollow spindle, the hollow spindle comprising:
  - one or more second tappets associated with a second profiling of an inner side of the hollow spindle, wherein the hollow spindle is connected to the inner shaft by a positive and axially displaceable shaft-hub connection defined by the first profiling and the second profiling, wherein the one or more elastic compensating elements engage the one or more second tappets to minimize radial play between the one or more first tappets and the one or more second tappets over an entire length of the hollow spindle;
  - an outer side having an external thread; and
  - a bearing seat, wherein the bearing is seated in the bearing seat, and wherein the bearing is configured to transmit axial thrust forces or axial tensile forces between the hollow spindle and the outer tube, wherein a rotational movement of the spindle system does not cause a rotational movement of the outer tube, wherein the external thread, the one or more second tappets, and the bearing seat are formed as a single casting of a plastic material.

* * * * *